United States Patent [19]

Convers et al.

[11] 4,286,390

[45] Sep. 1, 1981

[54] METHOD FOR REMOVAL OF WATER FROM ACTIVATED CARBON

[75] Inventors: Ronald J. Convers, Ponca City, Okla.; James A. DeBernardi, Sulphur, La.

[73] Assignee: Conoco, Inc., Ponca City, Okla.

[21] Appl. No.: 132,006

[22] Filed: Mar. 20, 1980

[51] Int. Cl.³ .............................................. F26B 7/00
[52] U.S. Cl. ........................................... 34/9; 34/17
[58] Field of Search ............... 34/9, 17, 36; 134/25.1, 134/30, 21; 210/770, 771; 252/411 R, 412

[56] References Cited

U.S. PATENT DOCUMENTS

| | | | |
|---|---|---|---|
| 2,843,942 | 7/1958 | Whitsel | 34/36 |
| 4,161,450 | 7/1979 | Vitat et al. | 34/9 |
| 4,184,893 | 1/1980 | Halvorson et al. | 134/25.1 |
| 4,212,112 | 7/1980 | LaDelfa et al. | 34/9 |

*Primary Examiner*—Ivars C. Cintins
*Attorney, Agent, or Firm*—Bayless E. Rutherford, Jr.

[57] ABSTRACT

A method of removing water from activated carbon is disclosed. Briefly, the method comprises (a) passing liquid 1,2-dichloroethane through a bed of activated carbon until a bulk water phase ceases to exit the bed or until from about 60 to about 80 weight percent of the water present in a water-saturated bed has been removed and (b) removing substantially all of the remainder of the water present by use of vacuum or by passing hot air or hot nitrogen through the activated carbon.

12 Claims, No Drawings

METHOD FOR REMOVAL OF WATER FROM ACTIVATED CARBON

FIELD OF THE INVENTION

The invention is in the general field of removing water from activated carbon. Particularly, it is in the field of removing water from activated carbon which has been used in the purification of 1,2-dichloroethane.

GENERAL BACKGROUND

The preparation of polyvinyl chloride from vinyl chloride is well-known. Further, the preparation of vinyl chloride by dehydrochlorination of 1,2-dichloroethane is well-known.

1,2-Dichloroethane can be prepared by the direct chlorination of ethylene in the presence of a catalyst such as ferric chloride. Unfortunately, this process may result in the presence of ferric chloride in the product. The removal of the ferric chloride from the 1,2-dichloroethane is desirable before dehydrochlorination in order that excessive by-product formation, coking and fouling in the cracking reactors might be avoided.

One means of removing ferric chloride from the 1,2-dichloroethane is by passing the stream through a bed of activated carbon. Such a process requires that the activated carbon be regenerated periodically by washing with water. In order for the regenerated activated carbon to be fully effective again it is necessary that substantially all of the water be removed from the activated carbon.

We have discovered an improved means of removing the water from the regenerated active carbon.

BRIEF SUMMARY OF THE INVENTION

Briefly, the present invention is directed to a method of removing water from activated carbon wherein the method comprises: (a) passing liquid 1,2-dichloroethane through a bed of activated carbon until a bulk water phase ceases to exit the bed or until from about 60 to about 80 weight percent of the water present in a water-saturated bed has been removed and (b) removing substantially all of the remainder of the water present by use of vacuum or by passing hot air or hot nitrogen through the activated carbon.

Stated differently, the present invention is directed to an improved method of drying activated carbon.

DETAILED DESCRIPTION

The activated carbon which is subjected to our process usually contains from about 0.1 to about 70 weight percent water. More usually, the activated carbon contains about 0.5 to about 50 weight percent water.

While our process can be used with any activated carbon containing water, it is particularly suitable for removing water from regenerated activated carbon which has been used to remove ferric chloride from 1,2-dichloroethane.

1,2-Dichloroethane is often referred to as ethylene dichloride, or simply as EDC. The term EDC will be used in much of the following description of our invention.

In the first step of our process liquid EDC is passed through a bed of activated carbon which contains water until a bulk water phase ceases to exit from the carbon bed or until about 60 to 80 weight percent of the water is removed. The temperature of the liquid EDC suitably is in the range of about 0° C. to the boiling point of EDC under operating conditions. In operations at atmospheric pressure, the preferred temperature is in the range of about 25° to about 70° C.

The amount of EDC used is expressed as weight of EDC per weight of activated carbon. A suitable amount of EDC used in this step is in the range of about 0.2 to about 4 times the amount of activated carbon. Preferably, the amount of liquid EDC used in this step is about 0.2 to 1.5 times the amount of carbon.

It might be well to mention that the relative amounts are often expressed as "bed weights". For example 2 bed weights of EDC refers to an amount of EDC which is 2 times the amount of activated carbon on a weight basis.

If desired, the required amount of EDC to be used in this step can be determined by monitoring the exit stream from the bed of activated carbon. At first the exit stream will be a single phase water stream. The exit stream changes to a two-phase water-EDC stream. The change from a single-phase stream to a two-phase stream indicates the end of the first step. If the activated carbon was initially water-saturated at this point some 60 to 80 weight percent of the original water has been removed.

It should be emphasized at this time that while more than 80 bed weights of liquid EDC are required to remove substantially all of the water, only about 0.5 to 1.5 bed weights are required to remove 60 to 80 weight percent of the water from an initially water-saturated carbon bed.

In the second step of our process substantially all of the remainder of the water present is removed either by (a) use of vacuum, or (b) blowing with hot air or hot nitrogen gas. Blowing with hot nitrogen is the preferred method.

By "vacuum" is meant reduction of ambient pressure in the carbon bed, so that water will evaporate or distill from the carbon bed at carbon temperatures lower than 100° to 110° C. at an economically useful rate. Suitable means of reducing the carbon bed's ambient pressure include vacuum pumps.

In blowing with nitrogen gas, the nitrogen gas can be at any temperature above about 0° C. Usually, the nitrogen gas is at a temperature in the range of about 100° to about 250° C.

A suitable amount of nitrogen gas for this step is about 5 to 50 times the amount of activated carbon on a weight basis. More preferably, the amount of nitrogen gas is about 5 to 20 times the amount of activated carbon. While larger amounts can be used it is not economical to do so.

Normally, the nitrogen blowing is conducted at atmospheric pressure. In some cases it may be desirable to use reduced pressure in combination with the nitrogen blowing. The conditions for blowing with air are the same as for blowing with nitrogen gas.

One means of determining the amount of hot gas or vacuum pumping needed to finish drying the carbon bed is to monitor bed temperatures. At the beginning of hot gas or vacuum use, bed temperatures tend to drop sharply. However, when the carbon bed is dry, the bed temperatures have risen again and stabilized.

The amount of hot gas or vacuum pumping required to completely dry the carbon bed depends upon many factors:

(a) bed temperature at the start of hot gas or vacuum use, (b) hot gas temperature and feed rate, (c) external heating, if any, on the walls of the carbon bed container, (d) degree of reduction of ambient pressure in the carbon bed or efficiency and capacity of the vacuum pump system used, and (e) rate of heat loss or heat gain through the carbon bed container walls.

Knowing that the remainder of the water is to be removed by use of vacuum or by nitrogen or air-blowing, and having the information provided in the foregoing, any person skilled in the art can readily determine the exact process conditions.

Activated carbon which has been treated by the process of our invention suitably will contain less than 50 mg of water per gram of activated carbon, more suitably less than 20 mg of water per gram of activated carbon, and preferably less than 10 mg of water per gram of activated carbon.

In considering these values it is noted that typical commercial activated carbon contains from 10 to 50 mg of water per gram of material.

It should be noted that this process requires that the EDC be removed from the nitrogen or air prior to venting either to the atmosphere. Processes for removing dichloroethane from air or nitrogen are well-known to those skilled in this art. Some processes which can be used are (a) refrigerative condensation of the EDC from the nitrogen or air stream, (b) solvent absorption of the EDC from the gas stream, (c) carbon absorption of the EDC from the gas stream, or (d) incineration of the gas stream. The choice of EDC removal process in commercial operations would most probably be dictated by the presence in a given commercial plant of facilities for EDC recovery or removal from other gas streams. Such facilities might be associated with the treatment of residual gases in a balanced vinyl chloride plant using air-based ethylene oxychlorination.

If vacuum instead of hot nitrogen blowing is employed to finish the carbon drying process, a suitable EDC recovery method is simply the use of cold traps or refrigerative condensation.

ADVANTAGES OF OUR INVENTION

Under certain conditions this invention has distinct economic advantages over other carbon bed drying processes. Some such conditions include an inexpensive, readily available source of nitrogen such as the residual gas from air-based ethylene oxychlorination, surplus air compression capacity, or surplus vacuum pumping capacity.

Another condition favoring the choice of the present invention is a time constraint. The use of a limited amount of liquid EDC before finishing the drying process with vacuum or hot gases shortens the total time needed to regenerate an activated carbon bed.

Use of this invention is also favored in conditions where suitable EDC is scarce or too expensive to use in volumes larger than those used in this invention.

In order to illustrate the nature of the present invention still more clearly the following examples will be given. It is to be understood, however, that the invention is not to be limited to the specific conditions or details set forth in these examples except insofar as such limitations are specified in the appended claims.

The apparatus used in these experiments can be described briefly as follows. The "drying vessel" was a ca 6"×1" I.D. stainless steel cylinder with a central ⅛" O.D. thermowell. The drying vessel was packed with activated carbon. One inch of fiberglass external insulation was placed on the vessel. The drying agent was heated to the desired temperature by an oil bath containing a 10 foot coil of ¼" stainless steel tubing. Suitable metering pumps passed the drying agent through the heated coil. From the oil bath the drying agent was passed over the activated carbon bed. Effluent from the drying vessel was passed through a water condenser which had a graduated collector connected to the bottom.

EXAMPLE 1

This example illustrates the invention.

The drying vessel was packed with 35.3 g of Pittsburgh Activated Carbon BPL 12×30 carbon. This carbon bed was saturated with excess deionized water and briefly blown free of interstitial water with a cool air stream to leave 28.1 g of added water on the bed. The initial water loading for the following carbon bed drying experiment was ca 820 mg of water/g of carbon.

In this example, starting bath temperature was 25° C. Ca 0.5 bed volume of liquid EDC was pumped into the carbon and 21 ml of separated water was collected in the graduated collector. The EDC pump was stopped. The bed feed line was disconnected and blown free of EDC with nitrogen. The oil bath was heated to 200° C. and nitrogen (3 l/min at 25° C., 1 atm) was sent through the heated coil into the carbon bed for 4.6 hours. Total nitrogen used was ca 27 bed weights, but bed temperatures stabilized at final values when as little as 18 bed weights of hot nitrogen was used. Final bed water content was 7.4 mg of water/g of carbon.

EXAMPLE 2

This example is comparative and shows the effect of omitting passing liquid EDC over the activated carbon.

The drying vessel was packed with 35.3 g of the activated carbon of Example 1. It was saturated with excess deionized water and briefly blown free of interstitial water with a cool air stream to leave 27.2 g of added water on the bed. Initial water loading for this drying experiment was ca 800 mg of water/g of carbon.

The oil bath temperature was maintained at ca 200° C. Water was metered into the heated coil at 2.5 g/min for 62 minutes. The water pump was stopped and nitrogen (3.0 l/min at 25° C., 1 atm) was metered through the heated coil and into the steam-heated carbon bed. Measurements showed essentially no change in bed water loading from this steam treatment of a similar carbon bed. A total of ca 23 bed weights of nitrogen were used. Final bed water content was 5.1 mg of water/g of carbon.

EXAMPLE 3

This example is comparative in that it shows the effect of using insufficient nitrogen blowing.

The drying vessel was packed with 34.3 g of the activated carbon of Example 1. It was saturated with excess deionized water and briefly blown free of interstitial water with a cool air stream to leave 26.7 g of added water on the carbon. Initial loading for the drying experiment was ca 800 mg of water/g of carbon.

Initial oil bath temperature was 25° C. A total of 1.75 bed weights (ca 0.7 bed volume) of liquid EDC at 25° C. was pumped into the wet bed over 10 min and ca 16 ml of separated water was collected in the graduated collector. The bed feed line was temporarily disconnected and blown free of EDC with nitrogen. The oil bath was heated to ca 200° C., and nitrogen (3.0 l/min at 25° C., 1 atm) was metered through the heated coil and into the carbon bed over 2.55 hours. Total nitrogen used was ca 15 bed weights. Final bed water content was ca 45 mg of water/g of carbon (incomplete drying).

EXAMPLE 4

This example is also comparative. It shows the results obtained when blowing with the same amount of nitrogen as used in Example 3 but omitting the use of liquid EDC.

The drying vessel was packed with 35.3 g of the activated carbon of Example 1. It was saturated with excess deionized water and briefly blown free of interstitial water with a cool air stream to leave 27.1 g of added water on the carbon. Initial loading for the drying experiment was ca 790 mg of water/g of carbon.

The oil bath temperature was maintained at ca 200° C. Water was metered into the heated coil at 3.3 g/min for 58 minutes. The water pump was stopped and nitrogen (3.0 l/min at 25° C., 1 atm) was metered through the heated coil and into the carbon bed over 2.55 hours. Total nitrogen used was ca 15 bed weights. Final bed water content was ca 130 mg of water/g of carbon.

EXAMPLE 5

This example is also comparative. It shows the effect of using liquid EDC alone without the nitrogen blowing.

The drying vessel was packed with 33.8 g of the activated carbon of Example 1. It was saturated with excess deionized water and then briefly blown free of interstitial water with a cool air stream to leave 26.9 g of added water on the carbon. Initial loading was ca 820 mg of water/g of carbon.

With the oil bath maintained at 25° C., a total of ca 77 bed weights of liquid EDC at 25° C. was pumped into the wet carbon bed over 6.0 hours. The bed was then briefly blown free of liquid EDC with nitrogen. Final bed water content was ca 93 mg of water/g of carbon, or ca 10 percent of initial water.

Thus, having described the invention in detail, it will be understood by those skilled in the art that certain variations and modifications may be made without departing from the spirit and scope of the invention as defined herein and in the appended claims.

We claim:

1. A method of removing water from activated carbon wherein the method comprises:

(a) passing about 0.2 to about 4 bed weights of liquid 1,2-dichloroethane through a bed of activated carbon, which contains from about 0.1 to about 70 weight percent water, until from about 60 to about 80 weight percent of the water present in the bed has been removed, and
   (b) removing substantially all of the remaining water by use of vacuum or by passing hot air or hot nitrogen through the activated carbon.

2. The method of claim 1 wherein in step (a) the temperature of the liquid 1,2-dichloroethane is about 0° C. to the boiling point of 1,2-dichloroethane under operating conditions.

3. The method of claim 2 wherein in step (b) vacuum is used to remove substantially all of the remaining water.

4. The method of claim 2 wherein in step (b) substantially all of the remaining water is removed by passing hot air or hot nitrogen through the acitvated carbon.

5. The method of claim 4 wherein in step (b) the temperature of the hot air or hot nitrogen is above 0° C. and about 5 to about 50 bed weights of hot air or hot nitrogen are used.

6. The method of claim 5 wherein in step (a) the temperature of the liquid 1,2-dichloroethane is about 25° to about 70° C.

7. The method of claim 6 wherein in step (a) the amount of liquid 1,2-dichloroethane is about 0.2 to about 1.5 bed weights.

8. The method of claim 7 wherein in step (b) the temperature of the hot air or hot nitrogen is about 100° to about 250° C.

9. The method of claim 8 wherein the amount of hot air or hot nitrogen is about 5 to 20 bed weights.

10. The method of claim 9 wherein hot nitrogen is used in step (b).

11. The method of claims 3, 5, 9, or 10 wherein the amount of water in the activated carbon after treatment is less than 10 mg of water per gram of activated carbon.

12. A method of removing water from activated carbon wherein the method comprises:

(a) passing about 0.5 bed weight of liquid 1,2-dichloroethane, which is at a temperature of about 25° C., through a bed of activated carbon whereby from about 60 to about 80 weight percent of the water present has been removed, and
   (b) passing about 18 bed weights of nitrogen, which is at a temperature in the range of about 100° to about 250° C., through the bed of activated carbon to remove substantially all of the remaining water.

* * * * *